US010364382B2

(12) United States Patent
Determan et al.

(10) Patent No.: US 10,364,382 B2
(45) Date of Patent: Jul. 30, 2019

(54) CURABLE POLYSILOXANE COMPOSITIONS AND PRESSURE SENSITIVE ADHESIVES MADE THEREFROM

(71) Applicant: 3M INNOVATIVE PROPERTIES COMPANY, St. Paul, MN (US)

(72) Inventors: Michael D. Determan, Mahtomedi, MN (US); Yu Yang, Eden Prairie, MN (US); Kiu-Yuen Tse, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 403 days.

(21) Appl. No.: 14/368,461

(22) PCT Filed: Dec. 18, 2012

(86) PCT No.: PCT/US2012/070240
§ 371 (c)(1),
(2) Date: Jun. 24, 2014

(87) PCT Pub. No.: WO2013/101535
PCT Pub. Date: Jul. 4, 2013

(65) Prior Publication Data
US 2014/0377494 A1 Dec. 25, 2014

Related U.S. Application Data

(60) Provisional application No. 61/581,288, filed on Dec. 29, 2011.

(51) Int. Cl.
| | |
|---|---|
| C08L 83/06 | (2006.01) |
| C08G 77/16 | (2006.01) |
| C08J 7/04 | (2006.01) |
| C09J 183/06 | (2006.01) |
| C09D 183/04 | (2006.01) |
| B05D 3/06 | (2006.01) |
| C09J 7/38 | (2018.01) |
| C09J 7/40 | (2018.01) |
| C09J 7/22 | (2018.01) |

(52) U.S. Cl.
CPC .............. *C09J 183/06* (2013.01); *B05D 3/06* (2013.01); *B05D 3/067* (2013.01); *C08G 77/16* (2013.01); *C09D 183/04* (2013.01); *C09J 7/22* (2018.01); *C09J 7/38* (2018.01); *C09J 7/40* (2018.01); *C09J 2483/00* (2013.01); *Y10T 428/1476* (2015.01); *Y10T 428/2804* (2015.01); *Y10T 428/2852* (2015.01)

(58) Field of Classification Search
CPC ...... C09J 183/06; C09J 7/0246; C09J 7/0225; C09J 7/0207; C09J 2483/00; B05D 3/067; B05D 3/06; C09D 183/04; C08G 77/16; Y10T 428/2804; Y10T 428/2852; Y10T 428/1476
See application file for complete search history.

(56) References Cited

U.S. PATENT DOCUMENTS

| | | | |
|---|---|---|---|
| 2,676,182 | A | 4/1954 | Daudt |
| 3,627,851 | A | 12/1971 | Brady |
| 3,772,247 | A | 11/1973 | Flannigan |
| 4,370,358 | A | 1/1983 | Hayes |
| 4,472,480 | A | 9/1984 | Olson |
| 4,707,531 | A | 11/1987 | Shirahata |
| 4,736,048 | A | 4/1988 | Brown |
| 4,753,977 | A | 6/1988 | Merrill |
| 4,774,310 | A | 9/1988 | Butler |
| 4,916,169 | A | 4/1990 | Boardman |
| 4,980,443 | A | 12/1990 | Kendziorski |
| 5,091,483 | A | 2/1992 | Mazurek |
| 5,219,958 | A | 6/1993 | Noomen |
| 5,248,739 | A | 9/1993 | Schmidt |
| 5,262,558 | A | 11/1993 | Kobayashi |
| 5,665,805 | A | 9/1997 | Hatanaka |
| 5,726,256 | A | 3/1998 | Benson |
| 5,861,472 | A | 1/1999 | Cifuentes |
| 6,124,371 | A | 9/2000 | Stanssens |
| 6,204,350 | B1 | 3/2001 | Liu |
| 6,235,832 | B1 | 5/2001 | Deng |
| 6,277,986 | B1 | 8/2001 | Hall-Goulle |
| 6,451,869 | B1 | 9/2002 | Butts |
| 6,551,761 | B1 | 4/2003 | Hall-Goulle |
| 6,780,484 | B2 | 8/2004 | Kobe |

(Continued)

FOREIGN PATENT DOCUMENTS

| | | |
|---|---|---|
| EP | 0444633 | 9/1991 |
| KR | 2009-0027242 | 3/2009 |

(Continued)

OTHER PUBLICATIONS

Knott, Advancements in Solventless Technology for Silicone PSAs, 1-6 (2006).
Lin, "Recent advances in silicone pressure-sensitive adhesives", Journal of Adhesion Science Technology, 2007, vol. 21, No. 7, pp. 605-623.
Mark, Encyclopedia of Polymer Science and Engineering, 265-270 (1989).

(Continued)

*Primary Examiner* — Jessica M Roswell
(74) *Attorney, Agent, or Firm* — Jeffrey M. Olofson

(57) ABSTRACT

Curable compositions include at least one polydiorganosiloxane with at least two hydroxysilyl moieties, at least one hydroxyl-functional polyorganosiloxane resin, and at least one photoactivatable composition that, upon exposure to radiation, generates at least one base selected from amidines, guanidines, phosphazenes, proazaphosphatranes. The curable compositions can be coated on substrates and cured to form coatings, including pressure sensitive adhesives.

20 Claims, No Drawings

(56) References Cited

U.S. PATENT DOCUMENTS

| | | |
|---|---|---|
| 6,805,933 B2 | 10/2004 | Patel |
| 6,835,422 B2 | 12/2004 | Kobe |
| 7,482,391 B1 | 1/2009 | Cross |
| 7,538,104 B2 | 5/2009 | Baudin |
| 8,097,689 B2 | 1/2012 | Ahn |
| 8,653,190 B2 | 2/2014 | Chatterjee |
| 8,840,993 B2 | 9/2014 | Yang |
| 8,841,399 B2 | 9/2014 | Yang |
| 2005/0234208 A1 | 10/2005 | Koch |
| 2008/0300358 A1 | 12/2008 | Cook |
| 2009/0076200 A1 | 3/2009 | Baudin |
| 2013/0101841 A1 | 4/2013 | Yang |

FOREIGN PATENT DOCUMENTS

| | | |
|---|---|---|
| WO | 2012-003108 | 1/2012 |
| WO | 2012-003152 | 1/2012 |
| WO | 2012-003153 | 1/2012 |
| WO | 2012-003160 | 1/2012 |
| WO | 2013-101742 | 7/2013 |

OTHER PUBLICATIONS

Rodima, "Acid-Base Equilibria in Nonpolar Media. 2.1 Self-Consistent Basicity Scale in THF Solution Ranging from 2-Methoxypyridine to EtP1(pyrr) Phosphazene", J. Org. Chem., 2002, vol. 67, No. 6, pp. 1873-1881.

Sobieski, "Formulating Silicone Pressure Sesnsitive Adhesievs for Application Performance", Technical Seminar Proceedings, 1986, 76-84.

Sun, "Bicyclic Guanidinium Tetraphenylborate: A Photobase Generator and a Photocatalyst for Living Anionic Ring-Opening Polymerization and Cross-Linking of Polymeric Materials Containing Ester and Hydroxy Groups", Journal of the American Chemical Society, 2008, vol. 130, No. 26, pp. 8130-8131.

International Search Report or PCT International Application No. PCT/US2012/070240 dated Apr. 25, 2013, 3 pages.

US 10,364,382 B2

CURABLE POLYSILOXANE COMPOSITIONS AND PRESSURE SENSITIVE ADHESIVES MADE THEREFROM

CROSS REFERENCE TO RELATED APPLICATIONS

This application is a national stage filing under 35 U.S.C. 371 of PCT/US2012/070240, filed Dec. 18, 2012, which claims priority to U.S. Provisional Application No. 61/581,288, filed Dec. 29, 2011, the disclosure of which is incorporated by reference in its/their entirety herein.

FIELD OF THE DISCLOSURE

This disclosure relates to curable polysiloxane compositions and articles prepared from these curable polysiloxanes compositions, especially pressure sensitive adhesives.

BACKGROUND

A wide variety of curable polysiloxane compositions are known. Many of these curable polysiloxane compositions are moisture-curable. The curable compositions can be used to prepare a wide range of surface coatings and surface treatments, ranging from release coatings to pressure sensitive adhesives. The moisture-curable polysiloxane compositions cure in the presence of moisture to form crosslinked materials. The moisture for curing is typically obtained from the atmosphere or from a substrate to which the composition has been applied, although it can also be added to the composition (for example, to enable curing in depth or in confinement).

Moisture-curable polysiloxane compositions usually comprise siloxane polymers having groups (for example, alkoxysilyl or acyloxysilyl moieties) that can react in the presence of moisture to form cured (that is, crosslinked) materials. Moisture-curable compositions comprising alkoxysilyl or acyloxysilyl functionality typically cure in two reactions. In the first reaction, the alkoxysilyl or acyloxysilyl groups hydrolyze in the presence of moisture and a catalyst to form silanol compounds having hydroxysilyl groups. In the second reaction, the hydroxysilyl groups condense with other hydroxysilyl, alkoxysilyl, or acyloxysilyl groups in the presence of a catalyst to form —Si—O—Si— linkages. The two reactions occur essentially simultaneously upon generation of the silanol compound. Commonly used catalysts for the two reactions include Bronsted and Lewis acids. A single material can catalyze both reactions. Generally, it is desirable that the hydrolysis and condensation reactions proceed quickly after the moisture-curable composition has been applied, for example, to a substrate. At the same time, however, the reactions must not occur prematurely, for example, during processing or storage.

A variety of approaches have been used for providing moisture-curable compositions that have acceptable cure rates without processing and storage difficulties. For example, two-part systems have been developed (one part comprising a functional siloxane polymer and the other part comprising a catalyst), with the two parts being mixed immediately prior to use. While this approach has been useful in small-scale applications, it has been less efficient for large-scale manufacturing, where delays caused by having to mix the two parts have been undesirable. Furthermore, coating operations must be completed expeditiously before the composition cures in the pot, and this has been difficult when working with large surface area substrates or a large volume of composition.

A related curing technology involves the condensation reaction between two silanol groups (—SiOH). The condensation reaction is, in effect, the second reaction of the moisture-curable system, in which the silanol groups are already present and need not be generated by hydrolysis of alkoxysilyl or acyloxysilyl groups. The condensation reaction also generates the same type of —Si—O—Si— linkage and generates a molecule of water as a byproduct. Many of the same types of catalysts and curing techniques applicable to moisture-curable siloxanes are applicable to this condensation as well.

A variety of catalyst systems for curable siloxane compositions have been developed that are storage stable and readily activatable. For example, photoactivatable nitrogen bases are described in U.S. Pat. No. 7,538,104 (Baudin et al.) and a series of patent applications have been filed using photoactivatable nitrogen bases as catalysts for silicone coating compositions: Ser. No. 61/360,068, "Curable-on-demand Polysiloxane Coating Composition"; Ser. No. 61/360,019, "Curable Polysiloxane Coating Composition"; Ser. No. 61/360,007, "Curable-on-demand Composition Comprising Dual Reactive Silane Functionality"; and Ser. No. 61/359,985, "Curable Composition Comprising Dual Reactive Silane Functionality"; all filed on Jun. 30, 2010.

Among the curable polysiloxane compositions known are pressure sensitive adhesive compositions. Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

Examples of curable polysiloxane compositions are presented in U.S. Pat. No. 4,370,358 (Hayes et al.) which describes ultraviolet light curable silicone pressure sensitive adhesives comprising an epoxy functional silicone polymer and a combination of standard MQ resins or epoxy functional MQ resins, which can be cured to an adhesive composition in the presence of certain bis(aryl)halonium salt catalysts; and US Patent Publication No. 2008/0300358 (Cook et al.) which describes a continuous process for producing silicone pressure sensitive adhesives which includes mixing (A) a hydroxyl-functional polydiorganosiloxane polymer, (B) a hydroxyl-functional polyorganosiloxane resin, and (C) a solvent, while heating the composition at a temperature above the vaporization point of the solvent and removing essentially all volatile species in an apparatus with a residence time sufficient for bodying ingredients (A) and (B).

SUMMARY

Disclosed herein are curable compositions, pressure sensitive adhesives prepared from curable compositions, and methods of preparing coatings using curable compositions.

In some embodiments, the curable composition comprises at least one polydiorganosiloxane comprising at least two hydroxysilyl moieties, at least one hydroxyl-functional polyorganosiloxane resin, and at least one photoactivatable composition that, upon exposure to radiation, generates at least one base selected from amidines, guanidines, phosphazenes, proazaphosphatranes, and combinations thereof.

Also disclosed herein are pressure sensitive adhesives comprising a cured curable composition, the curable composition comprising at least one polydiorganosiloxane comprising at least two hydroxysilyl moieties, at least one hydroxyl-functional polyorganosiloxane resin, and at least one photoactivatable composition that, upon exposure to radiation, generates at least one base selected from amidines, guanidines, phosphazenes, proazaphosphatranes, and combinations thereof.

Methods for preparing coatings comprise providing a curable composition, the curable composition comprising at least one polydiorganosiloxane comprising at least two hydroxysilyl moieties, at least one hydroxyl-functional polyorganosiloxane resin, and at least one photoactivatable composition that, upon exposure to radiation, generates at least one base selected from amidines, guanidines, phosphazenes, proazaphosphatranes, and combinations thereof, providing a substrate comprising at least a first major surface and a second major surface, applying the curable composition to at least a portion of at least one major surface of the substrate, and inducing the curable composition to cure to form a coating by exposing at least a portion of the curable composition to radiation.

DETAILED DESCRIPTION

There remains an ongoing need for curable polysiloxane compositions that can provide acceptable cure rates without significant processing and storage difficulties (for example, due to premature gelation). It is desirable that these compositions be efficiently processable (for example, without the need for mixing of a two-part system prior to cure), will employ catalysts that do not generate species requiring removal, and/or will not require heat activation (so as to enable curing at relatively low temperatures and/or the use of heat-sensitive substrates). It is also desirable that the compositions employ catalysts that are relatively non-toxic, provide compositions that are relatively stable in solution but are relatively fast-curing upon drying, and are effective in relatively low concentrations. Ideally, the compositions will be curable on demand (for example, by generation of the catalyst in situ) and coatable without the need for significant addition of solvent (for example, in 100 percent solids form).

In this disclosure, curable compositions are described that comprise at least one polydiorganosiloxane that comprises at least two hydroxysilyl moieties, at least one hydroxyl-functional polyorganosiloxane resin, and at least one photoactivatable composition that, upon exposure to radiation, generates at least one base selected from amidines, guanidines, phosphazenes, proazaphosphatranes, and combinations thereof. The curable compositions can be cured to give pressure sensitive adhesives. The pressure sensitive adhesives can be used to prepare a wide variety of articles.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "adhesive" as used herein refers to polymeric compositions useful to adhere together two adherends. Examples of adhesives are pressure sensitive adhesives.

Pressure sensitive adhesive compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

As used herein, the term "hydroxysilyl" refers to a monovalent moiety or group comprising a silicon atom directly bonded to a hydroxyl group (for example, the hydroxysilyl moiety can be of formula —Si(R)$_{3-p}$(OH)$_p$ where p is an integer of 1, 2, or 3 and R is a hydrolyzable or non-hydrolyzable group (generally, non-hydrolyzable) such as alkyl or aryl).

As used herein, the term "hydroxyl-functional" refers to a monovalent moiety or group comprising a terminal hydroxyl group.

As used herein, the term "catenated heteroatom" means an atom other than carbon (for example, oxygen, nitrogen, or sulfur) that replaces one or more carbon atoms in a carbon chain (for example, so as to form a carbon-heteroatom-carbon chain or a carbon-heteroatom-heteroatom-carbon chain).

As used herein, the term "heteroorganic" means an organic group or moiety (for example, an alkyl or alkylene group) containing at least one heteroatom (generally, at least one catenated heteroatom);

As used herein, the term "oxy" means a divalent group or moiety of formula —O—.

As used herein, the term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

As used herein, the term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

As used herein, the term "alkylene" refers to a divalent group that is a radical of an alkane. The alkylene can be straight-chained, branched, cyclic, or combinations thereof.

The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

As used herein, the term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example, —$CH_2CH_2(OCH_2CH_2)_n OCH_2CH_2$—.

As used herein, the term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

As used herein, the term "heteroarylene" refers to a divalent group that is carbocyclic and aromatic and contains heteroatoms such as sulfur, oxygen, nitrogen or halogens such as fluorine, chlorine, bromine or iodine.

As used herein, the term "aralkylene" refers to a divalent group of formula —$R^a$—$Ar^a$— where $R^a$ is an alkylene and $Ar^a$ is an arylene (i.e., an alkylene is bonded to an arylene).

In this disclosure, curable compositions are described that comprise at least one polydiorganosiloxane that comprises at least two hydroxysilyl moieties, at least one hydroxyl-functional polyorganosiloxane resin, and at least one photoactivatable composition that, upon exposure to radiation, generates at least one base selected from amidines, guanidines, phosphazenes, proazaphosphatranes, and combinations thereof.

The curable composition includes as a first component, a polydiorganosiloxane that comprises at least two hydroxysilyl moieties. A wide variety of materials are suitable as the first component. The polysiloxanes can be oligomers, polymers, or a combination thereof. Generally, the polysiloxanes are polymers, which can be linear, branched, or cyclic. Useful polymers include those that have random, alternating, block, or graft structures, or a combination thereof. The molecular weight and the reactive silane functionality of the first component, including the number and nature of the hydroxysilyl moieties, of the polysiloxanes can vary widely, depending upon, for example, the properties desired for the curable and/or cured composition.

Generally, the polydiorganosiloxanes of the first component are hydroxyl-endblocked, so as to comprise two terminal hydroxysilyl moieties (on average). The polysiloxanes typically have a weight average molecular weight of about 150 to about 1,000,000 (more typically, about 1,000 to about 1,000,000).

In some embodiments, the polysiloxane includes those that can be represented by the following general formula:

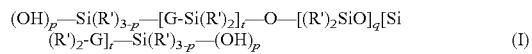
(I)

wherein each p is independently an integer of 1, 2, or 3 (typically, 1); each G is independently a divalent linking group; each R' is independently selected from alkyl, alkenyl, aryl, cycloalkyl, heteroalkyl, heteroaryl, heterocycloalkyl, and combinations thereof; q is an integer of 0 to about 150,000 (typically, about 20 to about 150,000); and each t is independently an integer of 0 or 1 (typically, 0). Generally, each R' is independently selected from alkyl having 1 to about 8 carbon atoms, aryl, or combinations thereof. More typically, each R' is independently selected from methyl, $C_6H_5C_2H_4$—, phenyl, and combinations thereof. In some embodiments each R' is methyl. Each divalent linking group, G, is independently selected from oxy, alkylene, arylene, heteroalkylene, heteroarylene, cycloalkylene, heterocycloalkylene, and combinations thereof, generally each G is independently selected from oxy, alkylene, arylene, and combinations thereof. Heteroatoms (in G and/or R') can include oxygen, sulfur, nitrogen, phosphorus, and combinations thereof, typically the heteroatoms are oxygen, sulfur, and combinations thereof, more typically, oxygen.

Examples of suitable polysiloxanes include hydroxyl-endblocked polydimethylsiloxane homopolymers, as well as hydroxyl-endblocked copolymers comprising dimethylsiloxane units and up to about 40 or 50 mole percent of other units selected from dialkylsiloxane units, (alkyl)(methyl)siloxane units, and (alkyl)(phenyl)siloxane units wherein each alkyl group is independently selected from alkyl groups having two to about 8 carbon atoms (for example, hexyl), diphenylsiloxane units, and combinations thereof.

The first component may comprise a single polysiloxane or it may comprise a mixture of different polysiloxanes. In some embodiments, the first component comprises a mixture of a relatively high molecular weight polydiorganosiloxane having a weight average molecular weight in the range of about 300,000 to about 1,000,000, more typically, about 400,000 to about 900,000, or even about 500,000 to about 700,000, and a relatively low molecular weight polydiorganosiloxane having a weight average molecular weight in the range of about 150 to about 150,000, more typically, about 10,000 to about 120,000, or even about 10,000 to about 15,000. The relative amounts of high molecular weight and low molecular weight component and their molecular weights can be selected to give the desired properties.

The polysiloxanes suitable for use as the first component can be prepared by known synthetic methods and many are commercially available. For example, the polysiloxanes available from Xiameter Corporation, Midland, Mich. under the tradename "OHX" are especially suitable polysiloxanes, and other useful polysiloxanes of varying molecular weight can be obtained from Gelest, Inc., Morrisville, Pa. (see, for example, the polysiloxanes described in *Silicon Compounds: Silanes and Silicones*, Second Edition, edited by B. Arkles and G. Larson, Gelest, Inc. (2008)).

The curable composition includes as a second component, at least one hydroxyl-functional polyorganosiloxane resin. A wide variety of hydroxyl-functional polyorganosiloxane resins are suitable. One particularly suitable class of materials is the class of materials called MQ silicate resins.

MQ silicate resins (or just MQ resins as they are often called) are copolymeric silicate resins having $R^a{}_3SiO_{1/2}$ (M) units and $SiO_{4/2}$ (Q) units, where each $R^a$ is independently a hydroxyl group or a monovalent organic group, with the proviso that at least one $R^a$ is a hydroxyl group. Suitable $R^a$ groups include alkyl groups, aryl groups, alkenyl groups, as well as halogenated versions of these groups. Such resins are described in, for example, Encyclopedia of Polymer Science and Engineering, vol. 15, John Wiley & Sons, New York, (1989), pp. 265 to 270, and U.S. Pat. Nos. 2,676,182; 3,627,851; 3,772,247; and 5,248,739. MQ silicate resins having functional groups are described in U.S. Pat. No. 4,774,310 which has silyl hydride groups, U.S. Pat. No. 5,262,558 which has vinyl and trifluoropropyl groups, and U.S. Pat. No. 4,707,531 which has silyl hydride and vinyl groups. Additional examples are included in U.S. Pat. Nos. 5,726,256 and 5,861,472. Exemplary M groups include $Me_3SiO_{1/2}$, $Me_2ViSiO_{1/2}$, $Me_2PhSiO_{1/2}$, $Ph_2MeSiO_{1/2}$, where Me means methyl, Vi means vinyl, and Ph means phenyl. The above described resins are generally prepared in solvent.

Suitable MQ resins typically have a molar ratio of M to Q units of 0.5 to 1.5 M units per Q unit (M/Q ratio). In some embodiments, the M/Q ratio is 0.6 to 1.2.

The MQ resin may comprise a single resin or it may be mixture. If more than one resin is present, the resins may vary in composition, molecular weight, substituent groups, or some combination of these attributes.

The MQ resin may have a number average molecular weight ranging from 1,500 to 15,000. In some embodiments, the number average molecular weight ranges from 3,000 to 7,500, or even 3,500 to 6,500 as measured by gel permeation chromatography.

Commercially available silicate resins include SR-545, MQ resin in toluene available from General Electric Co., Silicone Resins Division, Waterford, N.Y., MQOH resins which are MQ resins in toluene available from PCR, Inc., Gainesville, Fla., MQR-32-2, MQD resins in toluene available from Shin-Etsu Silicones of America, Inc., Torrance, Calif., and PC-403, hydride functional MQ resin in toluene available from Rhone-Poulenc, Latex and Specialty Polymers, Rock Hill, S.C. Such resins are generally supplied in organic solvent and may be employed in compositions of the present disclosure as received. However, these organic solutions of silicate resin may also be dried by any number of techniques known in the art, such as spray drying, oven drying, steam separation, etc., to provide a silicate resin at 100 percent non-volatile content for use in compositions of the present disclosure.

The curable compositions includes as a third component at least one photoactivatable composition that, upon exposure to radiation, generates at least one base selected from amidines, guanidines, phosphazenes, proazaphosphatranes, and combinations thereof. Photoactivatable compositions that generate self-protonatable forms of the bases (for example, aminoacids such as arginine) generally are less suitable and therefore excluded, as such forms of the bases are self-neutralized. Particularly desirable photoactivatable compositions include those that, upon exposure to radiation, generate at least one base selected from amidines, guanidines, and combinations thereof. Photactivatable compositions that generate amidines are particularly suitable, especially cyclic amidines.

The bases of the listed structural classes can effectively catalyze reaction between the first and second components described above. The bases (and their photoactivatable precursors) can be used in the curable composition singly (individually) or in the form of mixtures (including different structural classes).

Useful photoactivatable compositions include those that, upon exposure to radiation, generate amidines that can be represented by the following general formula:

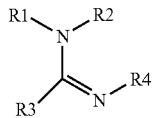

(II)

wherein R1, R2, R3, and R4 are each independently selected from hydrogen, monovalent organic groups, monovalent heteroorganic groups (for example, comprising nitrogen, oxygen, phosphorus, or sulfur in the form of groups or moieties that are bonded through a carbon atom and that do not contain acid functionality such as carboxylic or sulfonic), and combinations thereof; and wherein any two or more of R1, R2, R3, and R4 optionally can be bonded together to form a ring structure, generally, a five-, six-, or seven-membered ring, more typically, a six- or seven-membered ring. The organic and heteroorganic groups generally have from 1 to about 20 carbon atoms, in some embodiments, from 1 to about 10 carbon atoms, or even, from 1 to about 6 carbon atoms. Generally, R4 is not hydrogen.

Photoactivatable compositions that can generate amidines comprising at least one ring structure (that is, cyclic amidines) are desirable. Photoactivatable compositions that can generate cyclic amidines comprising two ring structures (that is, bicyclic amidines) are even more desirable.

Representative examples of useful photoactivatable compositions include those that can generate amidine compounds such as 1,2-dimethyl-1,4,5,6-tetrahydropyrimidine, 1-ethyl-2-methyl-1,4,5,6-tetrahydropyrimidine, 1,2-diethyl-1,4,5,6-tetrahydropyrimidine, 1-n-propyl-2-methyl-1,4,5,6-tetrahydropyrimidine, 1-isopropyl-2-methyl-1,4,5,6-tetrahydropyrimidine, 1-ethyl-2-n-propyl-1,4,5,6-tetrahydropyrimidine, 1-ethyl-2-isopropyl-1,4,5,6-tetrahydropyrimidine, DBU (that is, 1,8-diazabicyclo[5.4.0]-7-undecene), DBN (that is, 1,5-diazabicyclo[4.3.0]-5-nonene), and the like, and combinations thereof. Suitable photoactivatable compositions include those that can generate amidines such as 1,2-dimethyl-1,4,5,6-tetrahydropyrimidine, DBU (that is, 1,8-diazabicyclo[5.4.0]-7-undecene), DBN (that is, 1,5-diazabicyclo[4.3.0]-5-nonene), and combinations thereof, with those that can generate DBU, DBN, and combinations thereof being more desirable, especially those that can generate DBU.

Useful photoactivatable compositions include those that, upon exposure to radiation, generate guanidines that can be represented by the following general formula:

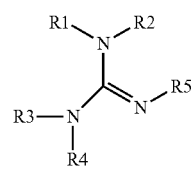

(III)

wherein R1, R2, R3, R4, and R5 each independently selected from hydrogen, monovalent organic groups, monovalent heteroorganic groups (for example, comprising nitrogen, oxygen, phosphorus, or sulfur in the form of groups or moieties that are bonded through a carbon atom and that do not contain acid functionality such as carboxylic or sulfonic), and combinations thereof; and wherein any two or more of R1, R2, R3, R4, and R5 optionally can be bonded together to form a ring structure, generally, a five-, six-, or seven-membered ring, typically a five- or six-membered ring, more typically a six-membered ring. The organic and heteroorganic groups generally have from 1 to about 20 carbon atoms, in some embodiments, from 1 to about 10 carbon atoms, or even, from 1 to about 6 carbon atoms. Generally, R5 is not hydrogen.

Photoactivatable compositions that can generate guanidines comprising at least one ring structure (that is, cyclic guanidines) are desirable. Photoactivatable compositions that can generate cyclic guanidines comprising two ring structures (that is, bicyclic guanidines) are even more desirable.

Representative examples of useful photoactivatable compositions include those that can generate guanidine compounds such as 1-methylguanidine, 1-n-butylguanidine, 1,1-dimethylguanidine, 1,1-diethylguanidine, 1,1,2-trimethylguanidine, 1,2,3-trimethylguanidine, 1,3-diphenylguanidine, 1,1,2,3,3-pentamethylguanidine, 2-ethyl-1,1,3,3-tetramethylguanidine, 1,1,3,3-tetramethyl-2-n-propylguanidine, 1,1,3,3-tetramethyl-2-isopropylguanidine, 2-n-butyl-1,1,3,3-tetramethylguanidine, 2-tert-butyl-1,1,3,3-tetramethylguanidine, 1,2,3-tricyclohexylguanidine, TBD (that is, 1,5,7-triazabicyclo[4.4.0]dec-5-ene), MTBD (that is, 7-methyl-1,5,7-triazabicyclo[4.4.0]dec-5-ene), 7-ethyl-1,5,7-triazabicyclo[4.4.0]dec-5-ene, 7-n-propyl-1,5,7-triazabicyclo[4.4.0]dec-5-ene, 7-isopropyl-1,5,7-triazabicyclo[4.4.0]dec-5-ene, 7-n-butyl-1,5,7-triazabicyclo[4.4.0]dec-5-ene, 7-isobutyl-1,5,7-triazabicyclo[4.4.0]dec-5-ene, 7-tert-butyl-1,5,7-triazabicyclo[4.4.0]dec-5-ene, 7-cyclohexyl-1,5,7-triazabicyclo[4.4.0]dec-5-ene, 7-n-octyl-1,5,7-triazabicyclo[4.4.0]dec-5-ene, 7-2-ethylhexyl-1,5,7-triazabicyclo[4.4.0]dec-5-ene, 7-decyl-1,5,7-triazabicyclo[4.4.0]dec-5-ene, biguanide, 1-methylbiguanide, 1-n-butylbiguanide, 1-(2-ethylhexyl)biguanide, 1-n-octadecylbiguanide, 1,1-dimethylbiguanide, 1,1-diethylbiguanide, 1-cyclohexylbiguanide, 1-allylbiguanide, 1-n-butyl-N2-ethylbiguanide, 1,1'-ethylenebisguanide, 1-[3-(diethylamino)propyl]biguanide, 1-[3-(dibutylamino)propyl]biguanide, N',N''-dihexyl-3,12-diimino-2,4,11,13-tetraazatetradecanediamidine, and the like, and combinations thereof. Suitable photoactivatable compositions include those that can generate guanidines such as TBD (that is, 1,5,7-triazabicyclo[4.4.0]dec-5-ene), MTBD (that is, 7-methyl-1,5,7-triazabicyclo[4.4.0]dec-5-ene), 2-tert-butyl-1,1,3,3-tetramethylguanidine, and combinations thereof. Particularly suitable photoactivatable compositions include those that can generate TBD, MTBD, and combinations thereof.

If desired, photoactivatable compositions that can generate amidines and/or guanidines exhibiting a pH value lower than 13.4 when measured using, for example, a pH meter.

Useful photoactivatable compositions further include those that, upon exposure to radiation, generate phosphazenes that can be represented by the following general formula:

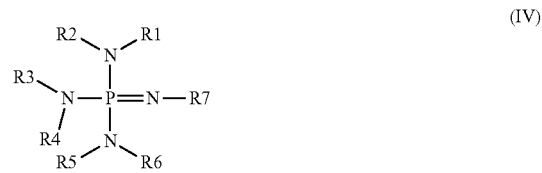

(IV)

wherein R1, R2, R3, R4, R5, R6, and R7 are each independently selected from hydrogen, monovalent organic groups, monovalent heteroorganic groups (for example, comprising nitrogen, oxygen, phosphorus, or sulfur in the form of groups or moieties that are bonded through a carbon atom and that do not contain acid functionality such as carboxylic or sulfonic), and combinations thereof; and wherein any two or more of R1, R2, R3, R4, R5, R6, and R7 optionally can be bonded together to form a ring, generally, a five-, six-, or seven-membered ring, typically a five- or six-membered ring, more typically a six-membered ring. The organic and heteroorganic groups generally have from 1 to about 20 carbon atoms, in some embodiments, from 1 to about 10 carbon atoms, or even, from 1 to about 6 carbon atoms. Generally, R7 is not hydrogen.

Representative examples of useful photoactivatable compositions include those that can generate phosphazene compounds such as

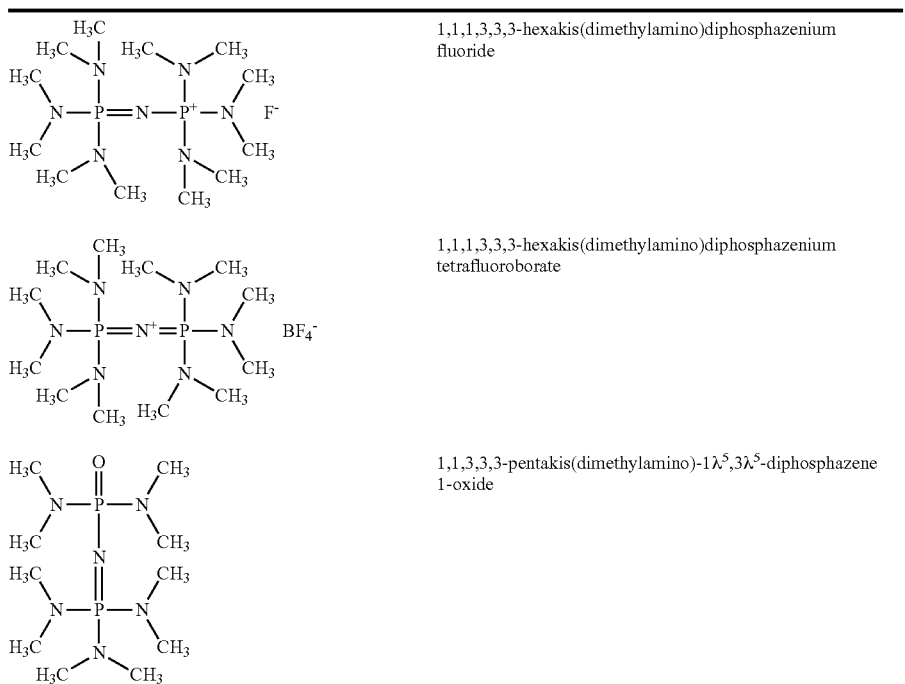

1,1,1,3,3,3-hexakis(dimethylamino)diphosphazenium fluoride 1,1,1,3,3,3-hexakis(dimethylamino)diphosphazenium tetrafluoroborate 1,1,3,3,3-pentakis(dimethylamino)-1$\lambda^5$,3$\lambda^5$-diphosphazene 1-oxide -continued

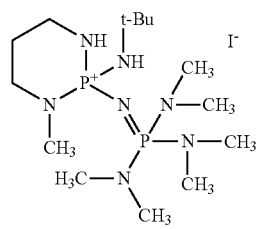 2-tert-butylamino-1-methyl-2-[tris(dimethylamino)phosphoranylidenamino]-perhydro-1,3,2-diazaphosphorinium iodide

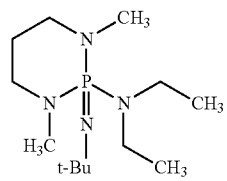 2-tert-butylimino-2-diethylamino-1,3-dimethylperhydro-1,3,2-diazaphosphorine

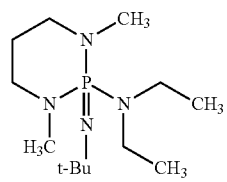 2-tert-butylimino-2-diethylamino-1,3-dimethylperhydro-1,3,2-diazaphosphorine

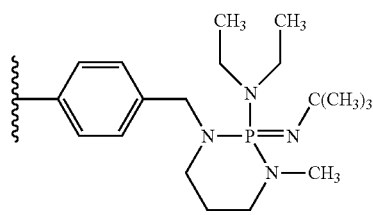 [SMILES: *c1ccc(CN2CCCN(C)P2(=NC(C)(C)C)N(CC)CC)cc1] 2-tert-butylimino-2-diethylamino-1,3-dimethylperhydro-1,3,2-diazaphosphorine

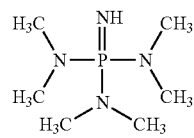 imino-tris(dimethylamino)phosphorane

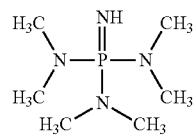 imino-tris(dimethylamino)phosphorane

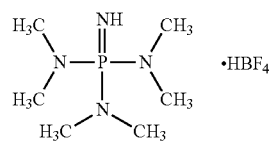 iminotris(dimethylamino)phosphonium tetrafluoroborate salt

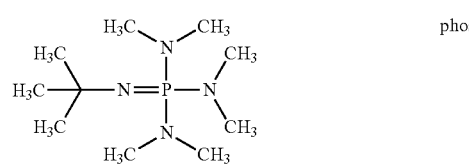 phosphazene base $P_1$—t-Bu

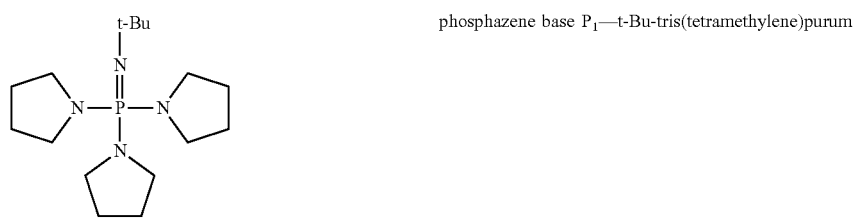
phosphazene base P₁—t-Bu-tris(tetramethylene)purum
phosphazene base P₁—t-Oct
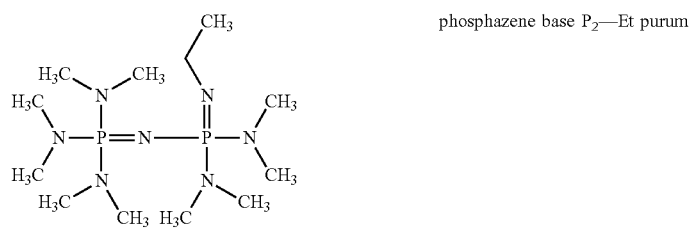
phosphazene base P₂—Et purum
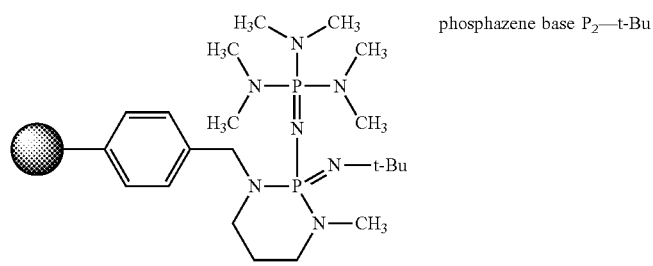
phosphazene base P₂—t-Bu
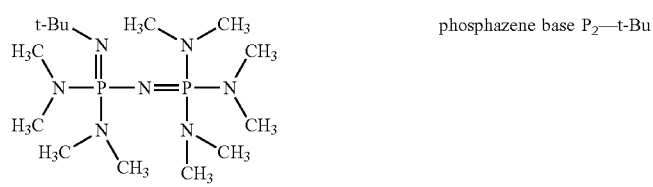
phosphazene base P₂—t-Bu
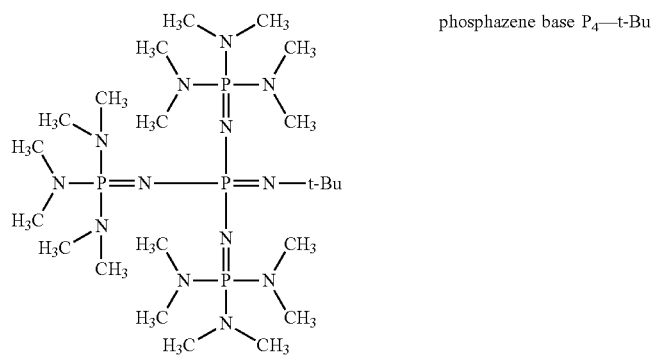
phosphazene base P₄—t-Bu

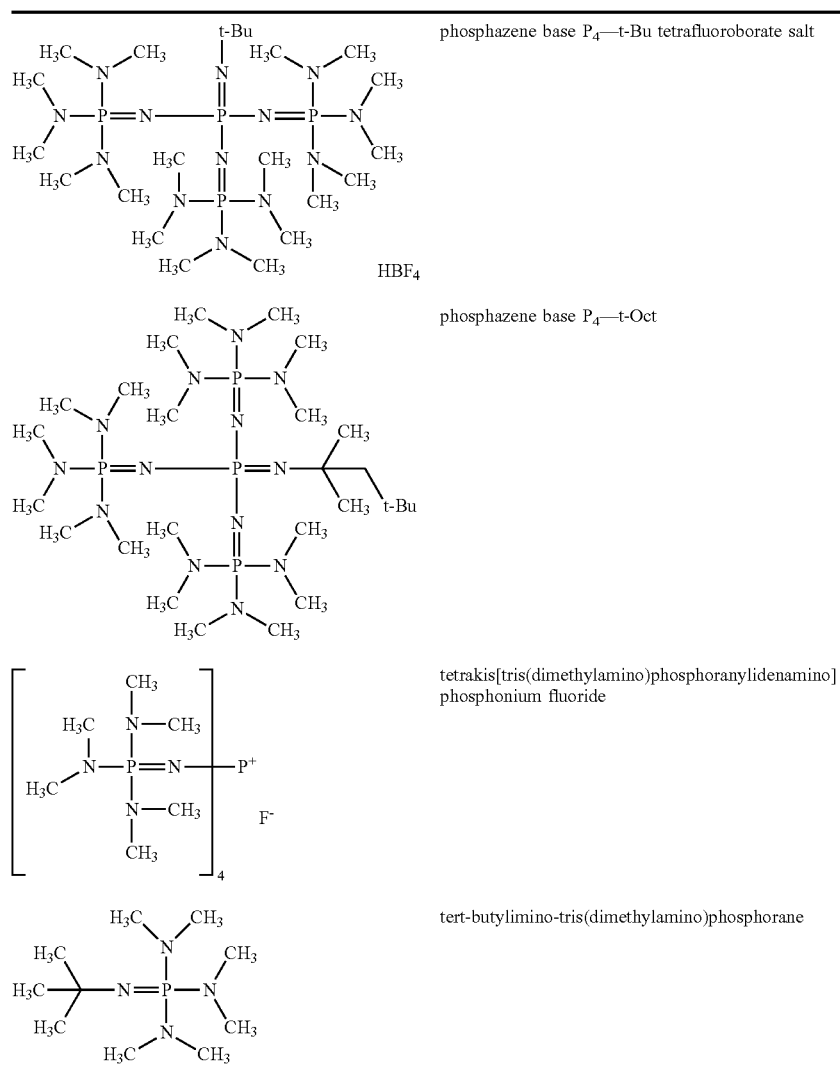

phosphazene base P₄—t-Bu tetrafluoroborate salt phosphazene base P₄—t-Oct tetrakis[tris(dimethylamino)phosphoranylidenamino]phosphonium fluoride tert-butylimino-tris(dimethylamino)phosphorane and the like, and combinations thereof. Suitable photoactivatable compositions include those that can generate phosphazenes such as 2-tert-butylimino-2-diethylamino-1,3-dimethylperhydro-1,3,2-diazaphosphorine, phosphazene base P₁-t-Bu-tris(tetramethylene), phosphazene base P₄-t-Bu, and combinations thereof.

Useful photoactivatable compositions also further include those that, upon exposure to radiation, generate proazaphosphatrane bases (Verkade's bases) that can be represented by the following general formula:

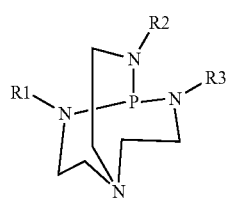

(V)

wherein R1, R2, and R3 are each independently selected from hydrogen, monovalent organic groups, monovalent heteroorganic groups (for example, comprising nitrogen, oxygen, phosphorus, or sulfur in the form of groups or moieties that are bonded through a carbon atom and that do not contain acid functionality such as carboxylic or sulfonic), and combinations thereof (less preferably hydrogen). The organic and heteroorganic groups generally have from 1 to about 20 carbon atoms, in some embodiments, from 1 to about 10 carbon atoms, or even, from 1 to about 6 carbon atoms.

Representative examples of useful photoactivatable compositions include those that can generate proazaphosphatrane compounds such as

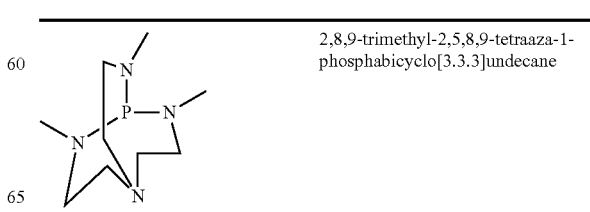

2,8,9-trimethyl-2,5,8,9-tetraaza-1-phosphabicyclo[3.3.3]undecane

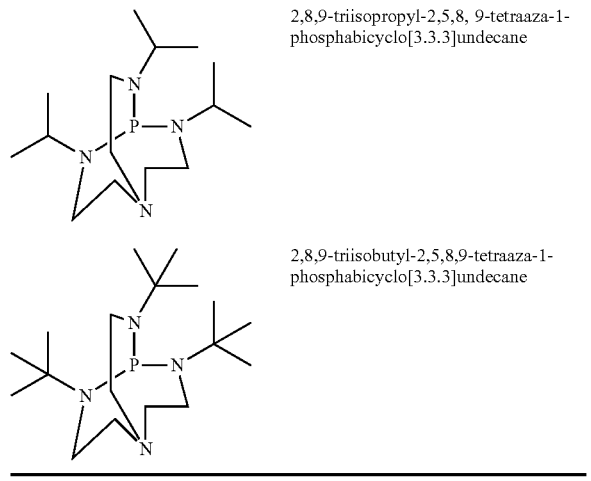

2,8,9-triisopropyl-2,5,8, 9-tetraaza-1-phosphabicyclo[3.3.3]undecane 2,8,9-triisobutyl-2,5,8,9-tetraaza-1-phosphabicyclo[3.3.3]undecane and the like, and combinations thereof. Suitable photoactivatable compositions include those that can generate 2,8,9-triisopropyl-2,5,8,9-tetraaza-1-phosphabicyclo[3.3.3]undecane.

Suitable photoactivatable compositions for use in generating the above-described bases are known. For example, salts that can generate amidine or guanidine bases upon thermal activation (for example, at elevated temperatures or upon exposure to infrared radiation) are described in U.S. Pat. No. 5,219,958 (Noomen et al.). A quaternary ammonium salt (namely, 8-(4'-benzoylphenylmethyl)-8-azania-1-aza-bicyclo[5.4.0]undec-7-ene benzo[o]mate) that generates DBU upon irradiation has been described by K. Suyama et al., Journal of Photopolymer Science and Technology 19(1), 81 (2006). U.S. Pat. No. 6,124,371 (Stanssens et al.) describes photolabile compounds of the structural formula Z-A (wherein Z is a photolabile group, A is a strong base, and Z is covalently bound to A) that can liberate amidine or guanidine bases upon irradiation (for example, ultraviolet light, electron beam, infrared, or laser irradiation).

U.S. Pat. No. 6,277,986 (Hall-Goule et al.) describes α-amino ketones (comprising an aromatic or heteroaromatic radical that is capable of absorbing light in the wavelength range of 200 to 650 nanometers (nm)) from which amidine bases can be liberated upon irradiation (with visible or ultraviolet light). U.S. Pat. No. 6,551,761 (Hall-Goule et al.) describes photoactivatable nitrogen-containing salts including tetraaryl- and triarylalkylborate salts of, for example, α-amidinium ketones. The photoactivatable salts can release amidine, guanidine, or phosphazene (and apparently, by extension, proazaphosphatrane) bases upon exposure to visible or ultraviolet light.

Particularly suitable photoactivatable compositions for use in the curable composition of this disclosure include those described in U.S. Pat. No. 7,538,104 (Baudin et al.). The compositions comprise at least one 1,3-diamine compound that is substituted on at least one nitrogen atom by at least one aralkyl radical. The aralkyl radical preferably comprises at least one aromatic or heteroaromatic radical that absorbs light in the wavelength range of 200 nm to 650 nm. Absorption of the light results in a photoelimination that leads to the generation of an amidine or guanidine.

A desirable class of such photoactivatable compositions comprises at least one 1,3-diamine compound selected from those that are represented by the formula $N(R_7)(R_6)—CH(R_5)—N(R_4)—C(R_1)(R_2)(R_3)$ (VI)

wherein $R_1$ is selected from aromatic radicals, heteroaromatic radicals, and combinations thereof that absorb light in the wavelength range from 200 nm to 650 nm and that are unsubstituted or substituted one or more times by at least one monovalent group selected from $C_1$-$C_{18}$ alkyl, $C_2$-$C_{18}$ alkenyl, $C_2$-$C_{18}$ alkynyl, $C_1$-$C_{18}$ haloalkyl, —$NO_2$, —$NR_{10}R_{11}$, —CN, —$OR_{12}$, —$SR_{12}$, —$C(O)R_{13}$, —$C(O)OR_{14}$, halogen, groups of the formula $N(R_7)(R_6)$—$CH(R_5)$—$N(R_4)$—$C(R_2)(R_3)$— where $R_2$-$R_7$ are as defined for Formula VI, and combinations thereof, and that upon said absorption bring about a photoelimination that generates an amidine or guanidine; $R_2$ and $R_3$ are each independently selected from hydrogen, $C_1$-$C_{18}$ alkyl, phenyl, substituted phenyl (that is, substituted one or more times by at least one monovalent group selected from $C_1$-$C_{18}$ alkyl, —CN, —$OR_{12}$, —$SR_{12}$, halogen, $C_1$-$C_{18}$ haloalkyl, and combinations thereof), and combinations thereof; $R_5$ is selected from $C_1$-$C_{18}$ alkyl, —$NR_8R_9$, and combinations thereof; $R_4$, $R_6$, $R_7$, $R_5$, $R_9$, $R_{10}$ and $R_{11}$ are each independently selected from hydrogen, $C_1$-$C_{18}$ alkyl, and combinations thereof; or $R_4$ and $R_6$ together form a $C_2$-$C_{12}$ alkylene bridge that is unsubstituted or is substituted by one or more monovalent groups selected from $C_1$-$C_4$ alkyl radicals and combinations thereof; or $R_5$ and $R_7$, independently of $R_4$ and $R_6$, together form a $C_2$-$C_{12}$ alkylene bridge that is unsubstituted or is substituted by one or more monovalent groups selected from $C_1$-$C_4$ alkyl radicals and combinations thereof; or, if $R_5$ is —$NR_8R_9$, then $R_7$ and $R_9$ together form a $C_2$-$C_{12}$ alkylene bridge that is unsubstituted or is substituted by one or more monovalent groups selected from $C_1$-$C_4$ alkyl radicals and combinations thereof; $R_{12}$ and $R_{13}$ are each independently selected from hydrogen, $C_1$-$C_{19}$ alkyl, and combinations thereof; and $R_{14}$ is selected from $C_1$-$C_{19}$ alkyl and combinations thereof.

The alkyl and haloalkyl groups can be linear or branched and, preferably, contain 1 to about 12 carbon atoms, in some embodiments 1 to about 6 carbon atoms. Halogen atoms include chlorine, fluorine, and/or bromine, generally chlorine and/or fluorine. The alkenyl groups can be linear or branched and, typically contain 2 to about 12 carbon atoms, more typically, 2 to about 6 carbon atoms. The alkynyl groups can be linear or branched and, typically contain 2 to about 12 carbon atoms, more typically, 2 to about 6 carbon atoms.

Suitable 1,3-diamine compounds of Formula VI include those wherein $R_1$ is selected from substituted and unsubstituted phenyl, naphthyl, phenanthryl, anthryl, pyrenyl, 5,6,7,8-tetrahydro-2-naphthyl, 5,6,7,8-tetrahydro-1-naphthyl, thienyl, benzo[b]thienyl, naphtho[2,3-b]thienyl, thianthrenyl, anthraquinonyl, dibenzofuryl, chromenyl, xanthenyl, thioxanthyl, phenoxathiinyl, pyrrolyl, imidazolyl, pyrazolyl, pyrazinyl, pyrimidinyl, pyridazinyl, indolizinyl, isoindolyl, indolyl, indazolyl, purinyl, quinolizinyl, isoquinolyl, quinolyl, phthalazinyl, naphthyridinyl, quinoxalinyl, quinazolinyl, cinnolinyl, pteridinyl, carbazolyl, β-carbolinyl, phenanthridinyl, acridinyl, perimidinyl, phenanthrolinyl, phenazinyl, isothiazolyl, phenothiazinyl, isoxazolyl, furazanyl, terphenyl, stilbenzyl, fluorenyl, phenoxazinyl, and combinations thereof, these radicals being unsubstituted or substituted one or more times by $C_1$-$C_{18}$ alkyl, $C_2$-$C_{18}$ alkenyl, $C_2$-$C_{18}$ alkynyl, $C_1$-$C_{18}$ haloalkyl, —$NO_2$, —$NR_{10}R_{11}$, —CN, —$OR_{12}$, —$SR_{12}$, —$C(O)R_{13}$, —$C(O)OR_{14}$, halogen, a radical of the formula $N(R_7)(R_6)$—$CH(R_5)$—$N(R_4)$—$C(R_2)(R_3)$—, or a combination thereof, where $R_2$-$R_7$ and $R_{10}$-$R_{14}$ are as defined for Formula VI, or $R_1$ is a substituted or unsubstituted biphenylyl radical, wherein each phenyl group is independently substituted with from zero to three (preferably, zero or one) substituents selected from $C_1$-$C_{18}$ alkyl, $C_2$-$C_{18}$ alkenyl, —OH, —CN, —OR$_{10}$, —SR$_{10}$, halogen, radicals of the formula N(R$_7$)(R$_6$)—CH(R$_5$)—N(R$_4$)—C(R$_2$)(R$_3$)—, and combinations thereof, where R$_2$-R$_7$ and R$_{10}$-R$_{14}$ are as defined for Formula VI.

More typically, R$_1$ is selected from substituted and unsubstituted phenyl, naphthyl, anthryl, anthraquinon-2-yl, biphenylyl, pyrenyl, thioxanthyl, thianthrenyl, phenothiazinyl, and combinations thereof. In some embodiments, R$_1$ is selected from substituted and unsubstituted phenyl, anthryl, naphthyl, anthraquinon-2-yl, biphenylyl, and combinations thereof, more typically, R$_1$ is selected from phenyl, 4-methylphenyl, biphenylyl, 2,4,6-trimethylphenyl, 4-cyanophenyl, 3-cyanophenyl, 2-chlorophenyl, 2,6-dichlorophenyl, 3-methoxyphenyl, 4-methoxyphenyl, 4-ethenylphenyl, 4-methylthiophenyl, 4-trifluoromethylphenyl, 2-nitrophenyl, 2,4,6-trimethoxyphenyl, 2,4-dimethoxyphenyl, naphthyl, anthryl, anthraquinon-2-yl, and combinations thereof, or is selected from the aforementioned radicals substituted with a radical of the formula N(R$_7$)(R$_6$)—CH(R$_5$)—N(R$_4$)—C(R$_2$)(R$_3$)—, where R$_2$-R$_7$ are as defined for Formula VI. Especially desirable embodiments are those where R$_1$ is selected from phenyl, 3-methoxyphenyl, 4-methoxyphenyl, 2,4,6-trimethoxyphenyl, 2,4-dimethoxyphenyl, and combinations thereof.

Generally, R$_2$ and R$_3$ each are independently selected from hydrogen, $C_1$-$C_6$ alkyl, and combinations thereof (more typically, both are hydrogen); R$_4$ and R$_6$ together form a $C_2$-$C_6$ alkylene (typically, $C_3$ alkylene) bridge that is unsubstituted or is substituted by one or more groups selected from $C_1$-$C_4$ alkyl radicals and combinations thereof; and/or R$_5$ and R$_7$ together form a $C_2$-$C_6$ alkylene (typically, $C_3$ or $C_5$ alkylene) bridge that is unsubstituted or is substituted by one or more groups selected from $C_1$-$C_4$ alkyl radicals and combinations thereof, or, if R$_5$ is —NR$_8$, R$_9$ and R$_7$ together form a $C_2$-$C_6$ alkylene bridge that is unsubstituted or substituted by one or more groups selected from $C_1$-$C_4$ alkyl radicals and combinations thereof.

Representative examples of useful photoactivatable compositions include those that comprise at least one compound selected from 5-benzyl-1,5-diazabicyclo[4.3.0]nonane, 5-(anthracen-9-yl-methyl)-1,5-diaza[4.3.0]nonane, 5-(2'-nitrobenzyl)-1,5-diazabicyclo[4.3.0]nonane, 5-(4'-cyanobenzyl)-1,5-diazabicyclo[4.3.0]nonane, 5-(3'-cyanobenzyl)-1,5-diazabicyclo[4.3.0]nonane, 5-(anthraquinon-2-yl-methyl)-1,5-diaza[4.3.0]nonane, 5-(2'-chlorobenzyl)-1,5-diazabicyclo[4.3.0]nonane, 5-(4'-methylbenzyl)-1,5-diazabicyclo[4.3.0]nonane, 5-(2',4',6'-trimethylbenzyl)-1,5-diazabicyclo[4.3.0]nonane, 5-(4'-ethenylbenzyl)-1,5-diazabicyclo[4.3.0]nonane, 5-(3'-trimethylbenzyl)-1,5-diazabicyclo[4.3.0]nonane, 5-(2',3'-dichlorobenzyl)-1,5-diazabicyclo[4.3.0]nonane, 5-(naphth-2-yl-methyl-1,5-diazabicyclo[4.3.0]nonane, 1,4-bis(1,5-diazabicyclo[4.3.0]nonanylmethyl)benzene, 8-benzyl-1,8-diazabicyclo[5.4.0]undecane, 8-benzyl-6-methyl-1,8-diazabicyclo[5.4.0]undecane, 9-benzyl-1,9-diazabicyclo[6.4.0]dodecane, 10-benzyl-8-methyl-1,10-diazabicyclo[7.4.0]tridecane, 11-benzyl-1,11-diazabicyclo[8.4.0]tetradecane, 8-(2'-chlorobenzyl)-1,8-diazabicyclo[5.4.0]undecane, 8-(2',6'-dichlorobenzyl)-1,8-diazabicyclo[5.4.0]undecane, 4-(diazabicyclo[4.3.0]nonanylmethyl)-1,1'-biphenyl, 4,4'-bis(diazabicyclo[4.3.0]nonanylmethyl)-11'-biphenyl, 5-benzyl-2-methyl-1,5-diazabicyclo[4.3.0]nonane, 5-benzyl-7-methyl-1,5,7-triazabicyclo[4.4.0]decane, and the like, and combinations thereof.

A particularly suitable group of photoactivatable compositions includes those that comprise at least one compound selected from 5-benzyl-1,5-diazabicyclo[4.3.0]nonane, 5-(anthracen-9-yl-methyl)-1,5-diaza[4.3.0]nonane, 5-(2'-nitrobenzyl)-1,5-diazabicyclo[4.3.0]nonane, 5-(4'-cyanobenzyl)-1,5-diazabicyclo[4.3.0]nonane, 5-(3'-cyanobenzyl)-1,5-diazabicyclo[4.3.0]nonane, 5-(anthraquinon-2-yl-methyl)-1,5-diaza[4.3.0]nonane, 5-(2'-chlorobenzyl)-1,5-diazabicyclo[4.3.0]nonane, 5-(4'-methylbenzyl)-1,5-diazabicyclo[4.3.0]nonane, 5-(2',4',6'-trimethylbenzyl)-1,5-diazabicyclo[4.3.0]nonane, 5-(4'-ethenylbenzyl)-1,5-diazabicyclo[4.3.0]nonane, 5-(3'-trimethylbenzyl)-1,5-diazabicyclo[4.3.0]nonane, 5-(2',3'-dichlorobenzyl)-1,5-diazabicyclo[4.3.0]nonane, 5-(naphth-2-yl-methyl-1,5-diazabicyclo[4.3.0]nonane, 1,4-bis(1,5-diazabicyclo[4.3.0]nonanylmethyl)benzene, 8-benzyl-1,8-diazabicyclo[5.4.0]undecane, 8-benzyl-6-methyl-1,8-diazabicyclo[5.4.0]undecane, 8-(2'-chlorobenzyl)-1,8-diazabicyclo[5.4.0]undecane, 8-(2',6'-dichlorobenzyl)-1,8-diazabicyclo[5.4.0]undecane, 4-(diazabicyclo[4.3.0]nonanylmethyl)-1,1'-biphenyl, 4,4'-bis(diazabicyclo[4.3.0]nonanylmethyl)-11'-biphenyl, 5-benzyl-2-methyl-1,5-diazabicyclo[4.3.0]nonane, 5-benzyl-7-methyl-1,5,7-triazabicyclo[4.4.0]decane, and combinations thereof.

Another suitable class of photoactivatable compositions are organoborate salts of the above described bases. Suitable organoborate anions include tetraaryl borate anions, and borate anions where one, two or even three of the aryl groups are replaced by hydrocarbon groups that are not aromatic. Additionally, some or all of the aryl groups may have some or all of the hydgrogen atoms substituted by fluorine groups or fluoroalkyl groups (such as for example a fluoromethyl group —CF$_3$). Typically these borate anions are described as "non-coordinating anions", meaning that they do not interact strongly with the cations of the protonated base molecules. Examples of particularly suitable fluorine substituted aryl groups include pentafluorophenyl (—C$_6$F$_5$) and 3,5-trifluoromethylphenyl (3,5-(CF$_3$)$_2$C$_6$H$_3$—).

Representative examples of useful organoborate salts include the triphenylethylborate, triphenylisopropylborate, triphenyl(tert-butyl)borate, diphenyldiethylborate, diphenylbis((methylthio)methyl)borate, phenyltris(tert-butylthio)methyl)borate, tetrakis[3,5-bis(trifluoromethyl)phenyl]borate, triphenyl[3,5-bis(trifluoromethyl)phenyl]borate, tetrakis(pentafluorophenyl)borate, tetrakis(trifluoromethylphenyl)borate, tetraphenylborate, and tetrakis(difluorophenyl)borate salts and the like, and combinations thereof.

Tetraaryl borate salts are particularly desirable, especially tetraphenyl borate which is commercially available. In some embodiments, the photoactivatable composition comprises tetraphenyl borate salts of protonated cations of the above-described bases. The tetraphenyl borate salts may be readily generated by protonating the base with an aqueous acid, such as for example, hydrochloric acid, to generate a salt of the protonated base with a Cl$^-$ counteranion. The Cl$^-$ counteranion can readily be replaced with a tetraphenyl borate anion (Ph$_4$B$^-$) by a metathesis reaction in water, by mixing the protonated base solution with an aqueous solution of, for example, sodium tetraphenyl borate. The [protonated base$^+$][Ph$_4$B$^-$] salt generally precipitates from water and can be isolated by, for example, filtration or centrifugation, and washed with water and other solvents. Upon isolation, additional purification steps can be carried out, such as recrystallization, if desired. Suitable preparative methods include those described by X. Sun et al. in "Bicyclic Guanidinium Tetraphenylborate: A Photobase Generator and A Photocatalyst for Living Anionic Ring-Opening Polymerization and Cross-Linking of Polymeric Materials Containing Ester and Hydroxy Groups," J. Am. Chem. Soc. 130, 8130 (2008) and by T. Rodima et al. in "Acid-Base Equilibria in Nonpolar Media. 2. Self-Consistent Basicity Scale in THF Solution Ranging from 2-Methoxypyridine to EtP$_1$ (pyrr) Phosphazene," J. Org. Chem. 67 (6), 1873 (2002). Additionally, salts suitable for use as the photoactivatable compositions are described in the US Patent Application "Curable-On-Demand Polysiloxane Coating Composition" filed on the same day as the present application. Examples of suitable tetraorgano borate salts include the tetraphenyl borate salts of protonated 1,8-diazabicyclo[5.4.0] undecene (protonated-DBU) and protonated 1,5-diazabicyclo[4.3.0]-5-nonene (protonated-DBN).

Among the various classes of useful photoactivatable compositions, a particularly suitable group of photoactivatable compositions includes those that comprise at least one compound selected from 8-benzyl-1,8-diazabicyclo[5.4.0] undecane, 8-benzyl-6-methyl-1,8-diazabicyclo[5.4.0]undecane, 9-benzyl-1,9-diazabicyclo[6.4.0]dodecane, 10-benzyl-8-methyl-1,10-diazabicyclo[7.4.0]tridecane, 11-benzyl-1,1'-diazabicyclo[8.4.0]tetradecane, and combinations thereof. Especially suitable are photoactivatable compositions that comprise at least one compound selected from 8-benzyl-1, 8-diazabicyclo[5.4.0]undecane, 8-benzyl-6-methyl-1,8-diazabicyclo[5.4.0]undecane, the tetraphenyl borate salt of protonated 1,8-diazabicyclo[5.4.0]undecene and combinations thereof.

The photoactivatable compositions can optionally further comprise at least one photosensitizer (for example, a compound having an absorption spectrum that overlaps or closely matches the emission spectrum of the radiation source to be used and that can improve the overall quantum yield by means of, for example, energy transfer or electron transfer to other component(s) of the photoactivatable composition). Useful photosensitizers include aromatic ketones (for example, substituted or unsubstituted benzophenones, substituted or unsubstituted thioxanthones, substituted or unsubstituted anthraquinones, and the like, and combinations thereof), dyes (for example, oxazines, acridines, phenazines, rhodamines, and the like, and combinations thereof), and the like, and combinations thereof. Suitable photosensitizers include aromatic ketones and combinations thereof, especially substituted or unsubstituted benzophenones, substituted or unsubstituted thioxanthones, and combinations thereof. Substituted or unsubstituted benzophenones and combinations thereof are particularly desirable. The amount of photosensitizer can vary widely, depending upon, for example, its nature, the nature of other component(s) of the photoactivatable composition, and the particular curing conditions. For example, amounts ranging from about 0.1 weight percent to about 0.5 weight percent can be useful for some applications.

The curable composition of this disclosure can be prepared by combining the above described first, second and third components in essentially any order, generally with agitation or stirring. Typically, the first and second components are combined initially, followed by addition of the third component. The composition can be maintained as a relatively shelf-stable, 1-part system (comprising all three components) in the substantial absence of radiation of an activating wavelength. The composition can be stable under such conditions for periods of up to, for example, days or weeks (a relatively long pot life), prior to coating or other application of the composition, with or without the addition of solvent (which is optional).

The relative amounts of the first and second components can vary widely, depending upon their nature and the desired properties of the curable and/or cured composition. The third component (the photoactivatable composition) can be present in the curable composition in amounts ranging, for example, from about 0.1 to about 10 weight percent, typically, from about 0.1 to about 5 weight percent, more typically, from about 0.5 to about 2 weight percent, based upon the total weight of the first, second, and third components.

If desired, the curable composition can comprise at least one solvent or diluent to aid in storage stability, mixing, and/or coating, particularly when components of the curable composition are polymeric. Suitable solvents for use in the curable composition of the invention include aprotic solvents such as aromatic solvents (for example, xylene, toluene, 1,2-dichlorobenzene, 1,3-dichlorobenzene, 1,4-dichlorobenzene, and the like, and mixtures thereof), ketones (for example, methyl ethyl ketone (MEK), cyclohexanone, and the like, and mixtures thereof), alkyl esters (for example, ethyl acetate, butyl acetate, and the like, and mixtures thereof), alkanes (for example, heptane, isoparaffinic hydrocarbons, and the like, and mixtures thereof), ethers (for example, t-butyl methyl ether, tetrahydrofuran (THF), and the like, and mixtures thereof), and the like, and mixtures thereof. Especially suitable solvents include aromatic solvents, alkanes, ketones, and mixtures thereof, with xylene, heptane, methyl ethyl ketone, and mixtures thereof being more desirable and heptane, methyl ethyl ketone, and mixtures thereof being even more desirable. Some particularly suitable embodiments are free of added solvent.

Minor amounts of optional components can be added to the curable composition to impart particular desired properties for particular curing methods or uses. Useful compositions can comprise conventional additives such as, for example, catalysts (including conventional condensation catalysts such as tin catalysts, which can be added as co-catalysts if desired), initiators, surfactants, stabilizers, thermal inhibitors, anti-oxidants, flame retardants, adhesion promoters, colorants, and the like, and mixtures thereof.

The curable compositions of this disclosure can be used to provide a variety of different compositions upon curing. While curing can be carried out in bulk, the curable compositions are particularly suitable for forming coatings. Coatings are formed by at least partially coating the curable composition onto the surface of a substrate, drying the coating (if solvent is present) and curing the coating to form an article. Examples of coatings that can be prepared from the curable compositions include hardcoats, protective films, pressure sensitive adhesives, heat activated adhesives, self wetting adhesives, optical films, including films with microstructures for manipulating light, elastomeric rubbers, including foamed elastomeric coatings (including open cell foams and bubble-filled foams).

Particularly suitable coatings are pressure sensitive adhesives. As described above, the pressure sensitive adhesives may be generated in bulk, but typically the curable composition is coated onto the surface of substrate and cured to form an adhesive article.

The curable composition can be applied to at least a portion of at least one major surface of a substrate using any suitable coating method. Useful coating methods include dip coating, spin coating, spray coating, wiping, roll coating, printing techniques, and the like. The composition can be applied in neat form or in the form of solvent solutions.

A wide variety of substrates are suitable for use in the articles of this disclosure. Examples of suitable substrates include films, release liners, tape backings, metal foils, plates, the outer surfaces of articles, and the like. The substrates may be rigid or flexible. Examples of rigid substrates include glass sheets, rigid polymeric sheets and device surfaces (for example metal). Examples of flexible substrates include films, sheets, foils, tape backings, release liners and the like. The substrate can contain polymeric materials, glass materials, ceramic materials, metal-containing materials (e.g., metals or metal oxides), or a combination thereof. The substrate can include multiple layers of material such as a support layer, a primer layer, a hard coat layer, a decorative design, and the like.

Examples of film substrates include polymeric films such as those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes and polypropylenes, polyvinyl chlorides, polyimides, cellulose triacetates, acrylonitrile-butadiene-styrene copolymers, and the like.

Examples of release liners include paper, e.g., kraft paper, or polymeric films, e.g., polyethylene, polypropylene or polyester. At least one surface of the liner can be treated with a release agent such as silicone, a fluorochemical, or other low surface energy based release material to provide a release liner. Suitable release liners and methods for treating liners are described in, e.g., U.S. Pat. Nos. 4,472,480, 4,980,443 and 4,736,048. The liner can have a microstructure on its surface that is imparted to the adhesive to form a microstructure on the surface of the adhesive film. The liner can then be removed to expose an adhesive film having a microstructured surface.

Examples of tape backings include polymeric films such as those described above, metal films, paper, creped paper, foams and the like. In some embodiments, the tape backing includes a releasing surface, often referred to as a low adhesion backsize or LAB, on the surface opposite to the surface that is coated with a pressure sensitive adhesive. This LAB surface permits the article to be rolled up and unrolled.

Examples of metal foils include thin films of metal or metal alloys such as aluminum foil, tin foil and the like.

Examples of plates include glass plates and polymeric plates. Often these polymeric plates are transparent like glass. Examples of polymeric plates include polymethylmethacrylate (PMMA) plates and polycarbonate (PC) plates.

The curable composition can be cured by exposing at least a portion of the composition to radiation of an appropriate wavelength to activate the photoactivatable composition. The preferred curing conditions will vary, depending upon the particular application and its accompanying requirements and conditions.

The radiation source and exposure time will vary depending upon, for example, the nature and amount of the photoactivatable composition. Sources of ultraviolet, visible, and/or infrared radiation can be useful (for example, wavelengths ranging from about 200 nm to about 650 or 700 nm or up to about 20,000 nm; preferably, ultraviolet radiation, visible radiation, or a combination thereof). Suitable radiation includes sunlight and light from artificial sources, including both point sources and flat radiators.

Representative examples of useful radiation sources include carbon arc lamps; xenon arc lamps; medium-pressure, high-pressure, and low-pressure mercury lamps, doped if desired with metal halides (metal halogen lamps); microwave-stimulated metal vapor lamps; excimer lamps; superactinic fluorescent tubes; fluorescent lamps; incandescent argon lamps; electronic flashlights; xenon flashlights; photographic flood lamps; electron beams; X-rays, produced by means of synchrotrons or laser plasma; laser light sources (for example, excimer lasers); and the like; and combinations thereof. The distance between the radiation source and the coated substrate can vary widely, depending upon the particular application and the type and/or power of the radiation source (for example, distances ranging from about 2 cm to about 150 cm can be useful).

Since water is generated as a byproduct of the curing reaction, an optional drying step may be employed to remove the formed water. The coating can be left to dry by exposure to air, or accelerated drying can be effected by the application of vacuum or heat to the coating.

Cure generally can be effected by carrying out irradiation and/or subsequent processing of the coated substrate at temperatures ranging from room temperature (for example, about 20-23° C.) to elevated temperatures. While temperatures of up to about 100° C. or more can be used, it is generally desirable to cure at about 20° C. to about 80° C. Generally, it is most desirable to cure at or near room temperature. Curing times can range from a few seconds or less (for example, at room temperature with adequate amounts of catalyst and light exposure) to minutes or hours (for example, under low catalyst and/or low light conditions).

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| MQ Resin | SR545 MQ resin (64 wt % solids in toluene), commercially available from Momentive Performance Materials, Albany, NY |
| Silanol-1 | FD 350, a silanol functional PDMS Fluid, 300,000 centiStokes, commercially available from Wacker Chemie AG, Adrian, MI. |
| Silanol-2 | OHX-4070, a silanol functional PDMS Fluid, 50000 centiStokes, commercially available from Xiameter (a Dow Corning Company), Midland, MI. |
| PET Film | Primed poly(ethyleneterephthalate) film commercially available as HOSTAPHAN 3SAB film, 51 micrometers (2.0 mils) thick, from Mitsubishi Polyester Film, LLC. Greer, S.C. |
| THF | Tetrahydrofuran commercially available from EMD Chemicals, Billerica, MA. |

-continued

Table of Abbreviations

| Abbreviation or Trade Designation | Description |
|---|---|
| MEK | Methyl ethyl ketone |
| BP | Benzophenone (BP) commercially available from Alfa Aesar. |
| DBU | 1,8-diazabicylo[5.4.0]undecene |
| DBUH | Protonated cation of DBU |
| PL-DBU | Photolabile DBU, 8-Benzyl-1,8-diazabicylo[5.4.0]undecane, see Synthesis Example S1 below. |
| PL-Salt | Photolabile salt, [DBUH][BPh$_4$], tetraphenyl borate salt of protonated 1,8-diazabicylo[5.4.0]undecene, see Synthesis Example S2 Below |

Test Methods
180° Peel Test

Adhesive tape samples were slit to a width of 1.27 centimeters (0.5 inch) and length of 12.7 centimeters (5 inches). The tape was applied to a clean stainless steel panel using four total passes of a 2 kg (4.5 lb) hard rubber roller. The sample was allowed to dwell for 20 minutes at room temperature (22° C.) and 50% relative humidity prior to testing. The panel was then mounted on an IMass 2000 Peel Tester and the tape peeled off at a 180° angle at a speed of 30.5 centimeters/minute (12 in/min). The adhesion peel force was measured in ounces/inch and converted to Newtons/decimeter (N/dm).

SYNTHESIS EXAMPLES

Synthesis Example S1

Preparation of 8-Benzyl-1,8-diazabicylo[5.4.0]undecane (PL-DBU)

To a mixture of 34.0 grams (0.2 mol) of DBU and 200 milliliters of toluene was added 34.2 grams (0.2 mol) of benzyl bromide. An insoluble oil began to form and then changed to a white solid while the temperature rose to 57° C. over 10 minutes. After 4 hours, the solid was filtered and dried to yield 62.5 grams of the 8-benzyl salt, soluble in water. A solution of 4.4 M NaBH$_4$ in 14M NaOH solution (1.58 grams) was diluted with 10 milliliters of water, 15 milliliters of t-butyl methyl ether added, and the magnetically-stirred mixture was cooled to 3° C. and 3.23 grams of the salt added. After 2 hours, the cold mixture was phase split, the aqueous layer extracted with t-butyl methyl ether, and the combined t-butyl methyl ether solutions dried and stripped to yield 0.86 grams of solid. GLC indicated 39% of the desired product, identified by gc/ms.

Synthesis Example S2

Preparation of [DBUH][BPh$_4$](PL-Salt)

A sample of DBU (50 mmol, 7.6 grams) was dissolved in 50 milliliters of 10% HCl (aq), and 17.1 grams (50 mmol) of NaBPh$_4$ solution in 50 milliliters of water was added. The desired salt formed a precipitate. The salt was filtered, washed several times with water and methanol, recrystallized from a 4:1 mixture of methanol and MEK, and dried in vacuo to yield 12.1 grams of product.

Comparative Examples C1-C7 and Examples 1-3

For each Example or Comparative Example, a curable composition was prepared by mixing Silanol-1 or Silanol-2 as specified in Table 1, with MQ Resin to yield a 77 weight % solids solution. THF was added to the solutions to yield 50 weight % solids solutions. These solutions were mixed for 2 hours to ensure complete homogenization. The PL-DBU and BP were added to the solutions as noted in Table 1 and allowed to mix for a further 2 hours. The resulting solutions were coated on PET Film using a knife coater to provide a dry coating thickness of 38.1 micrometers (1.5 mil). The solvent was removed from the film by placing the coating in a forced air drying oven maintained at 70° C. for 10 minutes. If the coatings were photolyzed by exposure to UV light by passing under a Fusion Systems H-bulb at 1.52 meters per minute (5 feet per minute) it was noted in Table 1.

TABLE 1

| Example | Curable Composition | Catalyst | UV Exposure | 180° Peel (N/dm) |
|---|---|---|---|---|
| C1 | Silanol-1/MQ Resin (48/52) | None | None | NM* |
| C2 | Silanol-2/MQ Resin (48/52) | None | None | NM* |
| C3 | Silanol-1/MQ Resin (48/52) | None | Yes | NM* |
| C4 | Silanol-2/MQ Resin (48/52) | None | Yes | NM* |
| C5 | Silanol-1/MQ Resin (48/52) | PL-Salt/BP (0.5/0.25) | None | NM* |
| C6 | Silanol-2/MQ Resin (48/52) | PL-Salt/BP (0.5/0.25) | None | NM* |
| C7 | Silanol-2/MQ Resin (48/52) | PL-DBU/BP (0.5/0.25) | None | NM* |
| 1 | Silanol-1/MQ Resin (48/52) | PL-Salt/BP (0.5/0.25) | Yes | 29.4 |
| 2 | Silanol-2/MQ Resin (48/52) | PL-Salt/BP (0.5/0.25) | Yes | 18.9 |
| 3 | Silanol-2/MQ Resin (48/52) | PL-DBU/BP (0.5/0.25) | Yes | 19.9 |

NM* = Not measured due to cohesive peel failure

What is claimed is:

1. A curable composition comprising:
   at least one polydiorganosiloxane, comprising at least two hydroxysilyl moieties; wherein the at least one polydiorganosiloxane, comprising at least two hydroxysilyl moieties comprises the following general formula:

(OH)$_p$—Si(R')$_{3-p}$-[G-Si(R')$_2$]$_r$—O—[(R')$_2$SiO]$_q$[Si(R')$_2$G]$_r$—Si(R')$_{3-p}$—(OH)$_p$ 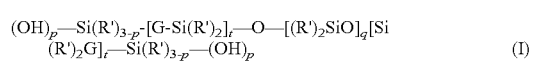

wherein each p is independently an integer of 1, 2, or 3; each G is independently a divalent linking group; each R' is independently selected from alkyl, alkenyl, aryl, cycloalkyl, heteroaryl, heterocycloalkyl, and combinations thereof; q is an integer of 0 to 150,000; and each t is independently an integer of 0 or 1 at least one hydroxyl-functional polyorganosiloxane resin; and at least one photoactivatable composition that, upon exposure to radiation, generates at least one base selected from amidines, guanidines, phosphazenes, proazaphosphatranes, and combinations thereof, wherein the curable composition cures upon exposure to radiation of the appropriate wavelength to activate the photoactivatable composition and upon curing is a pressure sensitive adhesive.

2. The composition of claim 1, wherein the polydiorganosiloxane comprises polydimethylsiloxane.

3. The composition of claim 1, wherein each G is independently selected from oxy, alkylene, arylene, heteroalkylene, heteroarylene, cycloalkylene, heterocycloalkylene, and combinations thereof; each R' is independently selected from alkyl, aryl, and combinations thereof; q is an integer of 20 to 150,000; and t is an integer of 0 or 1.

4. The composition of claim 1, wherein the at least one hydroxyl-functional polyorganosiloxane resin comprises an MQ resin.

5. The composition of claim 4, wherein the MQ resin comprises M units selected from $(CH_3)_3SiO_{1/2}$, $(CH_3)_2(Vi)SiO_{1/2}$, $(CH_3)_2ArSiO_{1/2}$, $(CH_3)Ar_2SiO_{1/2}$, and combinations thereof, where Vi is a vinyl group, and Ar is an aryl group.

6. The composition of claim 1, wherein the photoactivatable composition comprises at least one 1,3-diamine compound that is substituted on at least one nitrogen atom by at least one aralkyl radical, wherein the at least one 1,3-diamine compound is selected from those that are represented by the formula:

$N(R_7)(R_6)-CH(R_5)-N(R_4)-C(R_1)(R_2)(R_3)$     (VI)

wherein $R_1$ is selected from aromatic radicals, heteroaromatic radicals, and combinations thereof that absorb light in the wavelength range from 200 nm to 650 nm and that are unsubstituted or substituted one or more times by at least one monovalent group selected from $C_1$-$C_{18}$ alkyl, $C_2$-$C_{18}$ alkenyl, $C_2$-$C_{18}$ alkynyl, $C_1$-$C_{18}$ haloalkyl, $-NO_2$, $-NR_{10}R_{11}$, $-CN$, $-OR_{12}$, $-SR_{12}$, $-C(O)R_{13}$, $-C(O)OR_{14}$, halogen, groups of the formula $N(R_7)(R_6)-CH(R_5)-N(R_4)-C(R_2)(R_3)-$ where $R_2$-$R_7$ are as defined for Formula VI, and combinations thereof, and that upon said absorption bring about a photoelimination that generates an amidine or guanidine; $R_2$ and $R_3$ are each independently selected from hydrogen, $C_1$-$C_{18}$ alkyl, phenyl, substituted phenyl (that is, substituted one or more times by at least one monovalent group selected from $C_1$-$C_{18}$ alkyl, $-CN$, $-OR_{12}$, $-SR_{12}$, halogen, $C_1$-$C_{18}$ haloalkyl, and combinations thereof), and combinations thereof; $R_5$ is selected from $C_1$-$C_{18}$ alkyl, $-NR_8R_9$, and combinations thereof; $R_4$, $R_6$, $R_7$, $R_8$, $R_9$, $R_{10}$ and $R_{11}$ are each independently selected from hydrogen, $C_1$-$C_{18}$ alkyl, and combinations thereof; or $R_4$ and $R_6$ together form a $C_2$-$C_{12}$ alkylene bridge that is unsubstituted or is substituted by one or more monovalent groups selected from $C_1$-$C_4$ alkyl radicals and combinations thereof; or $R_5$ and $R_7$, independently of $R_4$ and $R_6$, together form a $C_2$-$C_{12}$ alkylene bridge that is unsubstituted or is substituted by one or more monovalent groups selected from $C_1$-$C_4$ alkyl radicals and combinations thereof; or, if $R_5$ is $-NR_8R_9$, then $R_7$ and $R_9$ together form a $C_2$-$C_{12}$ alkylene bridge that is unsubstituted or is substituted by one or more monovalent groups selected from $C_1$-$C_4$ alkyl radicals and combinations thereof; $R_{12}$ and $R_{13}$ are each independently selected from hydrogen, $C_1$-$C_{19}$ alkyl, and combinations thereof; and $R_{14}$ is selected from $C_1$-$C_{19}$ alkyl and combinations thereof.

7. The composition of claim 1, wherein the photoactivatable composition comprises at least one compound that is an organoborate salt of a protonated amidine, guanidine, phosphazene, or proazaphosphatrane.

8. The composition of claim 1, wherein the photoactivatable composition comprises at least one compound selected from 8-benzyl-1,8-diazabicyclo[5.4.0]undecane, 8-benzyl-6-methyl-1,8-diazabicyclo[5.4.0]undecane, the tetraaryl borate salt of protonated 1,8-diazabicylo[5.4.0]undecene, and combinations thereof.

9. The composition of claim 1, wherein the photoactivatable composition further comprises at least one photosensitizer.

10. The composition of claim 1, wherein the composition is solventless.

11. A pressure sensitive adhesive comprising:
a cured composition of claim 1.

12. The pressure sensitive adhesive of claim 11, wherein the at least one hydroxyl-functional polyorganosiloxane resin comprises an MQ resin.

13. A method of preparing a coating comprising:
providing a curable composition, of claim 1
providing a substrate comprising at least a first major surface and a second major surface;
applying the curable composition to at least a portion of at least one major surface of the substrate; and
inducing the curable composition to cure to form a coating by exposing at least a portion of the curable composition to radiation, wherein the coating comprises a pressure sensitive adhesive.

14. The method of claim 13, wherein the radiation comprises ultraviolet radiation, visible radiation, or a combination thereof.

15. The method of claim 13, further comprising drying the curable composition and/or the cured composition.

16. An article comprising:
a substrate comprising at least a first major surface and a second major surface; and
a pressure sensitive adhesive coated on at least a portion of at least one major surface of the substrate, the pressure sensitive adhesive comprising:
a cured composition of claim 1.

17. The article of claim 16, wherein the substrate comprises a film, a release liner, a tape backing, a metal foil, a plates, or the outer surface of an article.

18. The article of claim 16, wherein the at least one hydroxyl-functional polyorganosiloxane resin comprises an MQ resin.

19. The article of claim 16, wherein the photoactivatable composition comprises at least one compound that is an organoborate salt of a protonated amidine, guanidine, phosphazene, or proazaphosphatrane.

20. The article of claim 16, wherein the photoactivatable composition comprises at least one compound selected from 5-benzyl-1,5-diazabicyclo[4.3.0]nonane, 5-(anthracen-9-yl-methyl)-1,5-diaza[4.3.0]nonane, 5-(2'-nitrobenzyl)-1,5-diazabicyclo[4.3.0]nonane, 5-(4'-cyanobenzyl)-1,5-diazabicyclo[4.3.0]nonane, 5-(3'-cyanobenzyl)-1,5-diazabicyclo[4.3.0]nonane, 5-(anthraquinon-2-yl-methyl)-1,5-diaza[4.3.0]nonane, 5-(2'-chlorobenzyl)-1,5-diazabicyclo[4.3.0]nonane, 5-(4'-methylbenzyl)-1,5-diazabicyclo[4.3.0]nonane, 5-(2',4',6'-trimethylbenzyl)-1,5-diazabicyclo[4.3.0]nonane, 5-(4'-ethenylbenzyl)-1,5-diazabicyclo[4.3.0]nonane, 5-(3'-trimethylbenzyl)-1,5-diazabicyclo[4.3.0]nonane, 5-(2',3'-dichlorobenzyl)-1,5-diazabicyclo[4.3.0]

nonane, 5-(naphth-2-yl-methyl-1,5-diazabicyclo[4.3.0]nonane, 1,4-bis(1,5-diazabicyclo[4.3.0]nonanylmethyl)benzene, 8-benzyl-1,8-diazabicyclo[5.4.0]undecane, 8-benzyl-6-methyl-1,8-diazabicyclo[5.4.0]undecane, 9-benzyl-1,9-diazabicyclo[6.4.0]dodecane, 10-benzyl-8-methyl-1,10-diazabicyclo[7.4.0]tridecane, 11-benzyl-1,11-diazabicyclo[8.4.0]tetradecane, 8-(2'-chlorobenzyl)-1,8-diazabicyclo[5.4.0]undecane, 8-(2',6'-dichlorobenzyl)-1,8-diazabicyclo[5.4.0]undecane, 4-(diazabicyclo[4.3.0]nonanylmethyl)-1,1'-biphenyl, 4,4'-bis(diazabicyclo[4.3.0]nonanylmethyl)-11'-biphenyl, 5-benzyl-2-methyl-1,5-diazabicyclo[4.3.0]nonane, 5-benzyl-7-methyl-1,5,7-triazabicyclo[4.4.0]decane, the tetraaryl borate salt of protonated 1,8-diazabicylo[5.4.0]undecene, and combinations thereof.

* * * * *